(12) United States Patent
Zhang

(10) Patent No.: US 9,338,216 B2
(45) Date of Patent: May 10, 2016

(54) METHOD, SYSTEM AND NETWORK DEVICE FOR IMPLEMENTING HTTP-BASED STREAMING SERVICE

(75) Inventor: Shaobo Zhang, Shenzhen (CN)

(73) Assignee: SNAPTRACK, INC., San Diego, CA (US)

( * ) Notice: Subject to any disclaimer, the term of this patent is extended or adjusted under 35 U.S.C. 154(b) by 221 days.

(21) Appl. No.: 13/340,224

(22) Filed: Dec. 29, 2011

(65) Prior Publication Data

US 2012/0110138 A1    May 3, 2012

Related U.S. Application Data

(63) Continuation of application No. PCT/CN2010/078343, filed on Nov. 2, 2010.

(30) Foreign Application Priority Data

Nov. 9, 2009    (CN) .......................... 2009 1 0110053
Nov. 9, 2009    (CN) .......................... 2010 1 0282187

(51) Int. Cl.
  *G06F 15/16*    (2006.01)
  *H04L 29/08*    (2006.01)
  *H04L 29/06*    (2006.01)

(52) U.S. Cl.
  CPC ............ *H04L 67/06* (2013.01); *H04L 65/4084* (2013.01); *H04L 67/02* (2013.01)

(58) Field of Classification Search
  None
  See application file for complete search history.

(56) References Cited

U.S. PATENT DOCUMENTS

| 7,159,014 B2 * | 1/2007 | Kausik ..................... G06F 9/54 709/217 |
| 7,904,662 B2 * | 3/2011 | Dumont ............ G06F 17/30902 709/203 |
| 8,073,829 B2 * | 12/2011 | Lopez ............... G06F 17/30887 707/705 |
| 8,412,841 B1 * | 4/2013 | Swaminathan et al. ...... 709/231 |

(Continued)

FOREIGN PATENT DOCUMENTS

| CN | 1429452 A | 7/2003 |
| CN | 1481643 A | 3/2004 |

(Continued)

OTHER PUBLICATIONS

1$^{st}$ Office Action in corresponding Japanese Patent Application No. 2012-521955 (May 28, 2013).

(Continued)

*Primary Examiner* — Farid Homayounmehr
*Assistant Examiner* — Olanrewaju Bucknor
(74) *Attorney, Agent, or Firm* — Seyfarth Shaw LLP

(57) ABSTRACT

A method for implementing a Hyper Text Transfer Protocol (HTTP)-based streaming service is disclosed in the embodiments of the present invention. The method includes: a server receives a request from a client, and returns, to the client according to a request for a media presentation description file, a response that carries the media presentation description file; the server sets up a time synchronization relationship with the client; and the server receives a uniform resource locator from the client, obtains a corresponding media fragment file, and returns the media fragment file to the client for playing on the client, where the uniform resource locator is a uniform resource locator of a media fragment that is determined by the client and is required to be played, and is used for the client to request the media fragment file from the server.

14 Claims, 9 Drawing Sheets

(56) References Cited

U.S. PATENT DOCUMENTS

| | | | |
|---|---|---|---|
| 8,611,428 B1* | 12/2013 | Huang | H04N 21/2365 375/240 |
| 8,694,669 B2* | 4/2014 | Park et al. | 709/231 |
| 2004/0064573 A1 | 4/2004 | Leaning et al. | |
| 2005/0066371 A1* | 3/2005 | Lu | 725/105 |
| 2005/0232251 A1* | 10/2005 | Sylvain | 370/356 |
| 2005/0254526 A1 | 11/2005 | Wang et al. | |
| 2006/0159109 A1 | 7/2006 | Lamkin et al. | |
| 2008/0189430 A1* | 8/2008 | Klemets | 709/231 |
| 2009/0094644 A1* | 4/2009 | Jung et al. | 725/39 |
| 2009/0254657 A1 | 10/2009 | Melnyk et al. | |
| 2009/0254948 A1 | 10/2009 | Middleton et al. | |
| 2010/0235528 A1* | 9/2010 | Bocharov et al. | 709/231 |
| 2010/0318600 A1* | 12/2010 | Furbeck | 709/203 |
| 2011/0080940 A1* | 4/2011 | Bocharov et al. | 375/240.01 |
| 2011/0231519 A1* | 9/2011 | Luby et al. | 709/219 |
| 2011/0246660 A1* | 10/2011 | Bouazizi | 709/231 |

FOREIGN PATENT DOCUMENTS

| | | |
|---|---|---|
| CN | 101099142 A | 1/2008 |
| CN | 101176087 A | 5/2008 |
| CN | 101271720 A | 9/2008 |
| CN | 101282348 A | 10/2008 |
| CN | 101516057 A | 8/2009 |
| EP | 2071827 A2 | 6/2009 |
| JP | 11328073 A | 11/1999 |
| JP | 2007528140 A | 10/2007 |
| JP | 2008027480 A | 2/2008 |
| JP | 2008097381 A | 4/2008 |
| JP | 2008187505 A | 8/2008 |
| KR | 1020050001124 A | 1/2005 |
| WO | WO 2005004485 A1 | 1/2005 |

OTHER PUBLICATIONS

1st Office Action in corresponding Australian Patent Application No. 2010314582 (Jun. 5, 2013).

International Search Report in corresponding PCT Application No. PCT/CN2010/078343 (Feb. 17, 2011).

3rd Generation Partnership Project (3GPP), Nokia Corporation, "Dynamic HTTP Streaming," 3GPP TSG-SA4 MBS Ad-hoc, S4-AHI070, Seattle, USA (Sep. 28-Oct. 1, 2009).

3rd Generation Partnership Project (SGPP), Research in Motion UK Limited, "Tuning into a Live HTTP Stream with Client Controlled Adaptation," 3GPP TSG-SA4 #55, S4-090649, Kista, Sweden (Aug. 17-21, 2009).

2nd Office Action in corresponding Chinese Patent Application No. 200910110053.8 (Feb. 26, 2013).

1st Office Action in corresponding Korean Patent Application No. 10-2011-7031518 (Jun. 13, 2013).

Extended European Search Report in corresponding European Patent Application No. 10827895.3 (Apr. 18, 2012).

"Static HTTP Streaming," 3GPP TSG-SA4, Sep. 28, 2009, 3rd Generation Partnership Project, Valbonne, France.

Written Opinion of the International Searching Authority in corresponding PCT Patent Application No. PCT/CN2010/078343 (Feb. 17, 2011).

1st Office Action in corresponding European Patent Application No. 10827895.3 (Jan. 17, 2013).

European Oral Proceedings in corresponding European Patent Application No. 10827895.3 (Aug. 2, 2013).

"HTTP Streaming", Telefon AB LM Ericsson, ST-Ericsson (France) SAS, S4-090443, Jun. 22-26, 2009, total 2 pages.

"Use of Metadata for Client Controlled Adaptation of HTTP Streaming", Research in Motion UK Limited, S4-090648, Aug. 17-21, 2009, total 3 pages.

Songqing Chen et al. "SProxy: A Caching Infrastructure to Support Internet Streaming", Aug. 2007, total 11 pages.

Kahmann V. et al. "A proxy architecture for collaborative media streaming", 2002, total 9 pages.

Schulzrinne et al, IETF MMUSIC Working group, "Real Time Streaming Protocol 2.0 (RTSP)" draft-ietf-mmusic-rfc2326bis, Nov. 3, 2008, total 249 pages.

\* cited by examiner

METHOD, SYSTEM AND NETWORK DEVICE FOR IMPLEMENTING HTTP-BASED STREAMING SERVICE

CROSS-REFERENCE TO RELATED APPLICATIONS

This application is a continuation of International Application No. PCT/CN2010/078343, filed on Nov. 2, 2010, which claims priority to Chinese Patent Application No. 200910110053.8, filed on Nov. 9, 2009 and Chinese Patent Application No. 201010282187.0, filed on Nov. 9, 2009, all of which are hereby incorporated by reference in their entireties.

FIELD OF THE INVENTION

The present invention relates to the field of communication technologies, and in particular, to a method, network system, server, and network device for implementing Hyper Text Transfer Protocol (HTTP)-based streaming services.

BACKGROUND OF THE INVENTION

With popularization of the Internet, the streaming service develops rapidly. The streaming service may be based on a Hyper Text Transfer Protocol (Hyper Text Transfer Protocol, HTTP). Plenty of basic facilities including web server and content distribution network (CDN) support HTTP transport. The HTTP-based streaming media are becoming a trend.

The streaming service comes in two different types: record play and live play. Record play means that the played media content is created beforehand and then played, and is not real-time. Film play is a typical example of record play. Live play is relative to record play, and refers to playing media contents in real time. A typical example of live play is rebroadcast of a sports match, in which the sender creates the content in real time, including content coding and editing, and the receiver receives the content synchronously that is created by the sender in real time.

In a traditional streaming service, after creating a connection with the server, the client uses specially defined time "now" (now) to instruct the server to play the content, and then the client can receive the live content. In this process, the client does not need to learn the storage location of the content, and the server as a control entity sends the current content to the client. In an HTTP-based streaming service, the server is a passive service provider, and the server can only send a file or a part of a file to the client as requested by the client, and the client needs to indicate the requested file (using a URL), or a part of a file (using a URL plus a location interval), expressly.

In the process of implementing the present invention, the inventor finds the prior art has at least the following problems:

In the HTTP-based streaming service in the prior art, the live media data is generated in real time, and the client is unable to learn the accurate location of the currently generated media data beforehand. In this way, the client is unable to request the lately created media data, which brings difficulty to the live play service.

SUMMARY OF THE INVENTION

Embodiments of the present invention provide a method, server, client device and network system for implementing a Hyper Text Transfer Protocol HTTP-based streaming service, so that a client can obtain media data location information on the server, so as to implement a live play service of HTTP-based streaming media.

An embodiment of the present invention provides a method for implementing an HTTP-based streaming service, including:

receiving, by a server, a request from a client, and returning, according to a request for a media presentation description file, a response that carries the media presentation description file;

setting up a time synchronization relationship between the server and the client; and receiving a uniform resource locator from the client, obtaining a corresponding media fragment file, and returning the media fragment file to the client for playing on the client, where the uniform resource locator is a uniform resource locator of a media fragment that is required to be played and is determined by the client, and is used by the client to request a media fragment file from the server.

An embodiment of the present invention provides another method for implementing a Hyper Text Transfer Protocol HTTP-based streaming service, including:

sending, by a client, a request to a server, where the request is used for the server to return, according to the request, a response to the client, where the response carries a media presentation description file;

setting up, by the client, a time synchronization relationship with the server; and determining a uniform resource locator URL of a media fragment that is required to be played;

by the client, sending, to the server, a uniform resource locator corresponding to the media fragment that is required to be played, to request a media fragment file; and receiving, by the client, the media fragment file that is corresponding to the uniform resource locator and is returned by the server and playing the media fragment file.

An embodiment of the present invention provides another method for implementing a Hyper Text Transfer Protocol HTTP-based streaming service, including:

sending, by a server, live play start time and current time of the server to a client so that the client determines, according to the live play start time and the current time of the server, location indication information of a media fragment that is required to be played by the client;

by the server, receiving, from the client, the location indication information of the media fragment that is required to be played; and by the server, obtaining a media fragment file corresponding to the location indication information according to the location indication information, and sending the media fragment file to the client.

An embodiment of the present invention provides another method for implementing a Hyper Text Transfer Protocol HTTP-based streaming service, including:

receiving live play start time and current time of a server from the server;

determining, according to the live play start time and the current time of the server, location indication information of a media fragment that is required to be played;

sending, to the server, the location indication information of the media fragment that is required to be played;

receiving a media fragment file corresponding to the location indication information from the server; and playing the media fragment file.

An embodiment of the present invention provides a server, including:

a time information sending unit, configured to send live play start time and current time of the server to a client so that the client determines, according to the live play start time and the current time of the server, location indication information of a media fragment file that is required to be played;

a location indication information receiving unit, configured to receive, from the client, the location indication information of the media fragment file that is required to be played;

a media fragment file obtaining unit, configured to obtain the media fragment file according to the location indication information that is of the media fragment file that is required to be played on the client; and a media fragment file sending unit, configured to send the media fragment file to the client.

An embodiment of the present invention provides a client device, including:

a time information receiving unit, configured to receive live play start time and current time of a server from the server;

a determining unit, configured to determine, according to the live play start time and the current time of the server, location indication information of a media fragment that is required to be played;

a location indication information sending unit, configured to send, to the server, location indication information of a media fragment file that is required to be played;

a media fragment file receiving unit, configured to receive, from the server, a media fragment file corresponding to the location indication information of the media fragment that is required to be played; and a playing unit, configured to play the media fragment file.

An embodiment of the present invention provides a network system, including:

a server, configured to: send live play start time and current time of the server to a client so that the client determines, according to the live play start time and the current time of the server, location indication information of a media fragment that is required to be played; receive, from the client, the location indication information of the media fragment that is required to be played; obtain a media fragment file according to the location indication information that is of the media fragment required to be played on the client; and send the media fragment file to the client; and a client device, configured to: receive the live play start time and the current time of the server from the server, determine, according to the live play start time and the current time of the server, location indication information of the media fragment file that is required to be played, send, to the server, the location indication information of the media fragment that is required to be played, receive the media fragment file that is corresponding to the location indication information of the media fragment required to be played on the server, and play the media fragment file.

Through the method, server, client device and network system for implementing a Hyper Text Transfer Protocol HTTP-based streaming service in the embodiments of the present invention, the server sends the live play start time and the current time of the server to the client, so that the client can determine, according to the live play start time and the current time of the server, the location indication information of the media fragment that is required to be played, so as to implement a live play service of HTTP-based streaming media.

BRIEF DESCRIPTION OF THE DRAWINGS

To describe the technical solutions of the present invention more clearly, the following outlines the accompanying drawings involved in the embodiments of the present invention. Apparently, the accompanying drawings outlined below are some embodiments of the present invention, and persons of ordinary skill in the art can derive other drawings from the embodiments without making any creative effort.

DETAILED DESCRIPTION OF THE EMBODIMENTS

The technical solutions of embodiments of the present invention are clearly and comprehensively described with reference to the accompanying drawings in the embodiments of the present invention. Evidently, the embodiments to be described are some rather than all embodiments of the present invention. All other embodiments derived by those skilled in the art from the embodiments given herein without any creative effort shall fall within the scope of the present invention.

The following describes terms involved in the embodiments of the present invention:

Media fragment (fragment): it may refer to an encapsulation form of media data. A media fragment includes media data of a time interval and information related to the media data. Each media fragment may be stored as an independent file, called a media fragment file.

Media presentation description file (Media Presentation Description File): describes basic information of media presentation, for example, a media component, an attribute of code data (for example, attributes of a video component include an encoding type and a decoding type, bit rate of a video, frame rate, resolution and the like), live play or not, time length of the media fragment, and how to obtain relevant media data.

Media component (Media Component): a component in media presentation, for example, video component, audio component, text component or the like.

Media component interval (Media Component Interval): it corresponds to a media component of a time window. All time intervals of a media component are concatenated together to form an entirety of the media component. Time intervals of the media component do not overlap each other.

Alternative representation (Alternative representation): it may refer to that a group of parameters such as a certain bit rate, and resolution at time and space are used to express code representation of a media component.

Code segment (Segment): code data of a certain media component at a time interval. By specifying a media component, media component interval, and alternative representation, a client can request a code segment. A code segment can be decoded independently of other code segments.

Media code data: data generated as a result of encoding a certain media component, for example, data generated as a result of encoding a video according to a certain bit rate, frame rate, or resolution.

Figure 1:
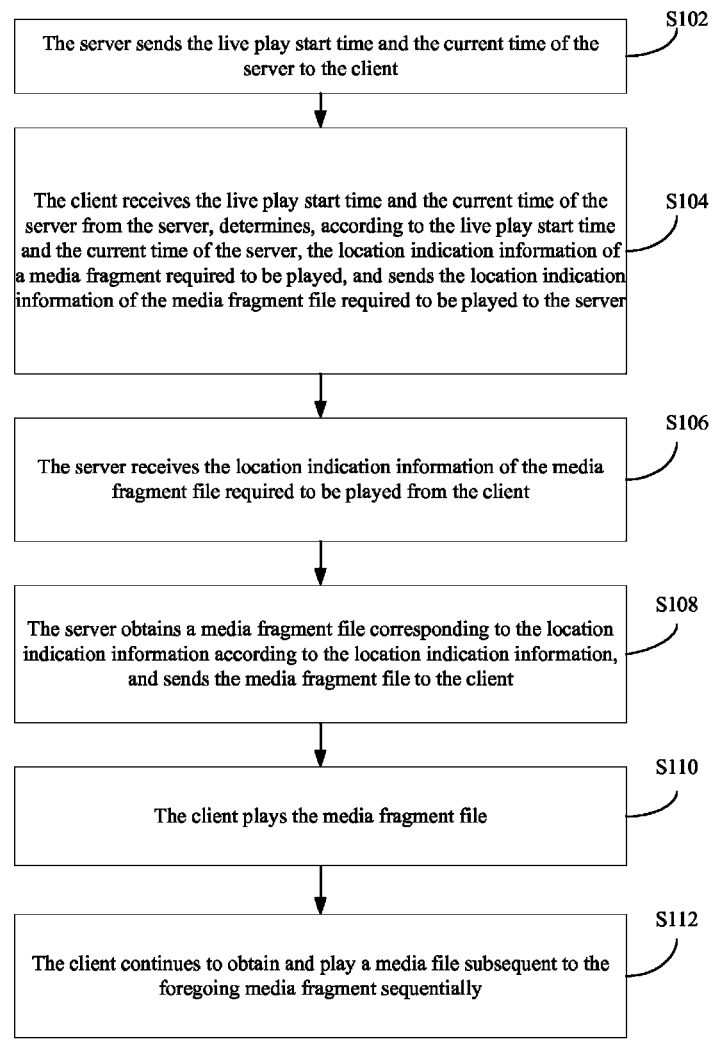
FIG. 1 is a flowchart of a method for implementing an HTTP-based streaming service according to an embodiment of the present invention.

As shown in FIG. 1, an embodiment of the present invention provides a method for implementing an HTTP-based streaming service. Each media fragment of the media presentation is stored in a server in the form of a single file. In the embodiment of the present invention, the method includes the following steps:

S102. A server sends live play start time and current time of the server to a client.

The live play start time may be obtained in different ways. When the client requests a live play service, the client requests a media presentation description file from the server first. The server may send the live play start time to the client by returning a response carrying a Hyper Text Transfer Protocol HTTP header Last-Modified. The time in the Last-Modified is the last modification time of the media presentation description file. The file is generated when a live play starts, so the time may be regarded as the live play start time.

The live play start time may be carried in the media presentation description file to be sent to the client.

The server sends the live play start time to the client through a Hyper Text Transfer Protocol HTTP header Date in a response returned by the server to the client after the client requests the media presentation description file. The time in the Date is the time of originating the response, and when the sending delay of the server is ignored, the time is the current time of the server.

S104. The client receives the live play start time and the current time of the server from the server, determines, according to the live play start time and the current time of the server, location indication information of a media fragment file that is required to be played, and sends, to the server, the location indication information of the media fragment file that is required to be played.

The client calculates and saves time offset according to the current time of the server and the local time of the client, and can easily obtain server time corresponding to any local time according to the time offset. Transmission delay is ignored in the process.

More specifically, in the embodiment of the present invention, the client can obtain time length of the media fragment locally or from the server. The parameter may be obtained from the media presentation description file (the parameter may also be appointed beforehand or standardized). The location information of the media fragment that is required to be played is determined according to the live play start time, the current time of the server, and the time length of the media fragment. The location information may be in various forms such as a sequence number of the media fragment that is required to be played. The client may send the sequence number to the server directly, and the server converts the sequence number into the location (such as URL) of the media fragment file. The client may also obtain a uniform resource locator template locally or from the server, and generate, according to the sequence number and the uniform resource locator template, a uniform resource locator URL corresponding to the media fragment file that is required to be played.

The location indication information in the embodiment of the present invention may be a uniform resource locator (Uniform Resource Locator, URL), or may also be information indicative of a file location, such as a file index number. The location indication information in subsequent embodiments may be, but is not limited to, the location indication information described above.

In this embodiment, the media fragment that is required to be played by the client may be a latest media fragment being played live, or a media fragment that starts from a specific past time as specified by the client according to practical requirements. In all subsequent embodiments, "a media fragment that is required to be played" may be, but is not limited to, that described above.

In this embodiment, the location indication information may be carried in a media fragment request sent by the client to the server. In subsequent embodiments, the location indication information may be processed in a similar way.

S106. The server receives the location indication information that is of the media fragment required to be played on the client.

S108. The server obtains a media fragment file corresponding to the location indication information according to the location indication information, and sending the media fragment file to the client.

S108. The client receives, from the server, a media fragment file corresponding to the location indication information of the media fragment file that is required to be played.

S110. The client plays the media fragment file.

S112. The client continues to sequentially obtain and play a media file subsequent to the foregoing media fragment.

Figure 2:
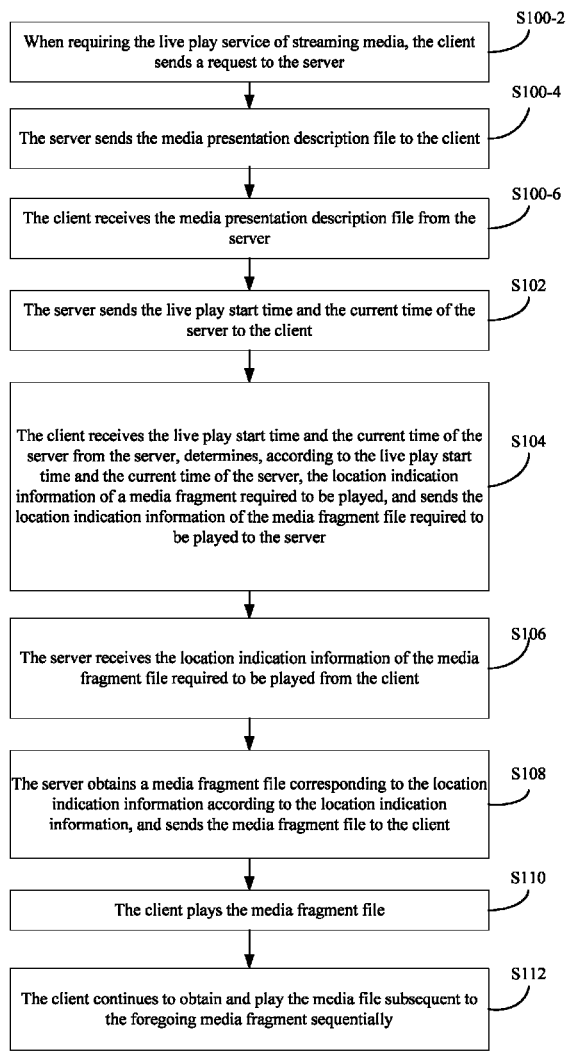
FIG. 2 is a flowchart of another method for implementing an HTTP-based streaming service according to an embodiment of the present invention.

As shown in FIG. 2, before step S102, the method in the embodiment of the present invention may further include:

S100-2. When the client requires obtaining a live play service, the client sends a request to the server.

In this step, the request sent by the client to the server may carry a request for the media presentation description file.

The media presentation description file may describe basic information of media data, for example, time length of the media fragment, a storage location of the media data, a media component (a media component, such as an audio component, a video component, a text component or the like), and attributes of media data (for example, attributes of video data include an encoding type and a decoding type, a bit rate of a video, a frame rate, a resolution and the like). The file may be generated when a live play starts. The uniform resource locator template, live play start time, and time length of the media fragment mentioned above may be carried in the media presentation description file.

S100-4. The server sends the media presentation description file to the client.

S100-6. The client receives the media presentation description file from the server.

The client may retrieve the uniform resource locator template, live play start time, and time length of the media fragment from the file to generate the uniform resource locator of the media fragment that is required to be played.

The order of the steps of the method in the embodiment of the present invention may be adjusted according to practical requirements.

In the embodiment of the present invention, the live play start time sent by the server to the client may be carried in a Hyper Text Transfer Protocol HTTP header Last-Modified or in the media presentation description file, and the current time of the server that is sent to the client may be carried in a Hyper Text Transfer Protocol HTTP header Date. However, the embodiment of the present invention is not limited to the protocol and the fields described above, and other protocols and fields may also be adopted. When the two fields described above are used, an HTTP protocol is not required to be extended and investments can be saved.

Through the embodiment of the present invention, the server sends the live play start time and the current time of the server to the client, so that the client can obtain, according to the live play start time and the current time of the server, the location indication information of the media fragment file that is required to be played, and further obtain, from the server, a media fragment file corresponding to the location indication information, so as to implement the live play service of the HTTP-based streaming media. Through the embodiment of the present invention, it is not necessary to extend the HTTP protocol or add additional functions to the server, and the existing basic facilities can be made full use of, so as to save investments and reduce costs.

Figure 3:
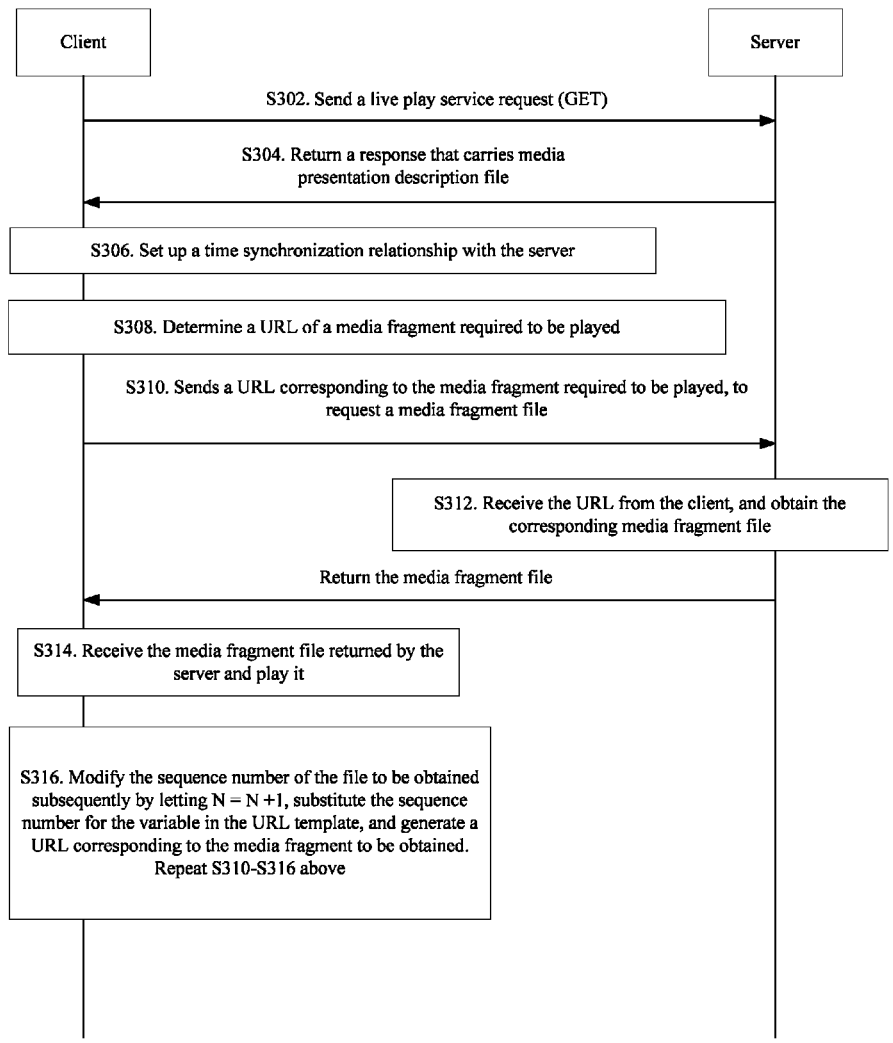
FIG. 3 is a flowchart of still another method for implementing an HTTP-based streaming service according to an embodiment of the present invention.

In another embodiment of the present invention, the method of live play of HTTP-based streaming media is described in more detail. As shown in FIG. 3, the method in the embodiment of the present invention includes the following steps:

S302. When the client requires obtaining a live play service, the client sends a request to the server. The request may be a GET message, and carries a request for the media presentation description file.

S304. The server receives the request for the live play service from the client, and, according to the request, returns, to the client, a response RESPONSE that carries the media presentation description file.

Specially, the time of generating the media presentation description file, namely, the live play start time, may be carried in the media presentation description file or in a Hyper Text Transfer Protocol HTTP header Last-Modified; and the time of originating (originate) the response, namely, the current time of the server, may be carried in a Hyper Text Transfer Protocol HTTP header Date. In this way, the server notifies the client of the live play start time and the current time of the server. The time in "Last Modified" and "Date" may be expressed in Greenwich Mean Time (Greenwich Mean Time, GMT), and the minimum unit of the time may be seconds. The live play start time is the time recorded by the server, and the current time comes from the server, and therefore, the two time values come from the same source, so as to avoid impact caused by time difference between the server and the client.

S306. The client sets up a time synchronization relationship with the server.

In this step, the client may calculate and save the time offset $\Delta T$=local time−current time of the server according to the current time of the server and the local time. According to the time offset $\Delta T$, server time corresponding to any local time is easily obtained.

S308. The client determines the uniform resource locator URL of the media fragment that is required to be played.

The client may calculate the media fragment that is required to be played, according to the current time of the server and the live play start time. The media fragment that is required to be played may be a lately generated media fragment, or a media fragment that starts from a specific past time as specified by the client according to practical requirements.

For example, a local variable N may be set. The variable N represents a sequence number of a file to be obtained. According to the current time of the server and the live play start time, the client may calculate a sequence number L of a latest media fragment file being played live, and assign the file sequence number L to the variable N. L may be calculated through the following formula:

$$L=\mathrm{int}((T-T0)/Ts),$$

where

T is the current time of the server, T0 is the live play start time, Ts is the time length of the media fragment (this parameter may be obtained from the information sent by the server, or appointed beforehand, or standardized), int( ) is a rounding function, and int(x) represents a maximum integer not greater than x.

The client may specify a past time T1 as start time of watching. According to the time offset $\Delta T$ between the current time of the server and the local time, the server time corresponding to the local time is obtained through $T2=T1-\Delta T$, where T2 fulfills: $T0 \leq T2 \leq T$. According to the formula $L'=\mathrm{int}((T2-T0)/Ts)$, a sequence number L' of the media fragment file that is watched starting from a specified past time T1 is calculated, and the sequence number L' is assigned to the local variable N.

In this embodiment, the creating of a media content is to generate a media fragment at fixed time intervals. Each media fragment is stored as an independent file in the server, and is called a media fragment file. By replacing the variable in the uniform resource locator template with the sequence number N of the file to be obtained, the client generates a uniform resource locator (URL) corresponding to the media fragment.

S310. The client sends, to the server, a uniform resource locator corresponding to the media fragment that is required to be played, to request a media fragment file.

S312. The server receives the uniform resource locator from the client, obtains a corresponding media fragment file, and returns the media fragment file.

S314. The client receives the media fragment file returned by the server and plays the file.

S316. The client modifies the sequence number of the file that is to be subsequently obtained, that is, lets N=N+1, and replaces the variable in the URL template with the sequence number to generate a uniform resource locator (URL) corresponding to the media fragment to be obtained. Steps S310-S316 are repeated to continuously request and obtain subsequent media fragment files.

Upon receiving a first media fragment file, the client starts playing the media fragment file, and plays obtained media fragment files sequentially. It should be specially noted that steps S310-S316 may occur concurrently, namely, the client obtains a file with a sequence number N+1 while playing a file with a sequence number N.

The order of the steps of the method in the embodiment of the present invention may be adjusted according to practical requirements.

The following describes the media presentation description file. The media presentation description file may be generated by the server upon a start of a live play. The file describes basic information of media data to be generated, for example, media components, attributes of code data (for example, attributes of a video component include an encoding type and a decoding type, a bit rate of the video, a frame rate, and a resolution), live play or not, time length of the media fragment, how to obtain relevant media data and the like.

Figure 4:
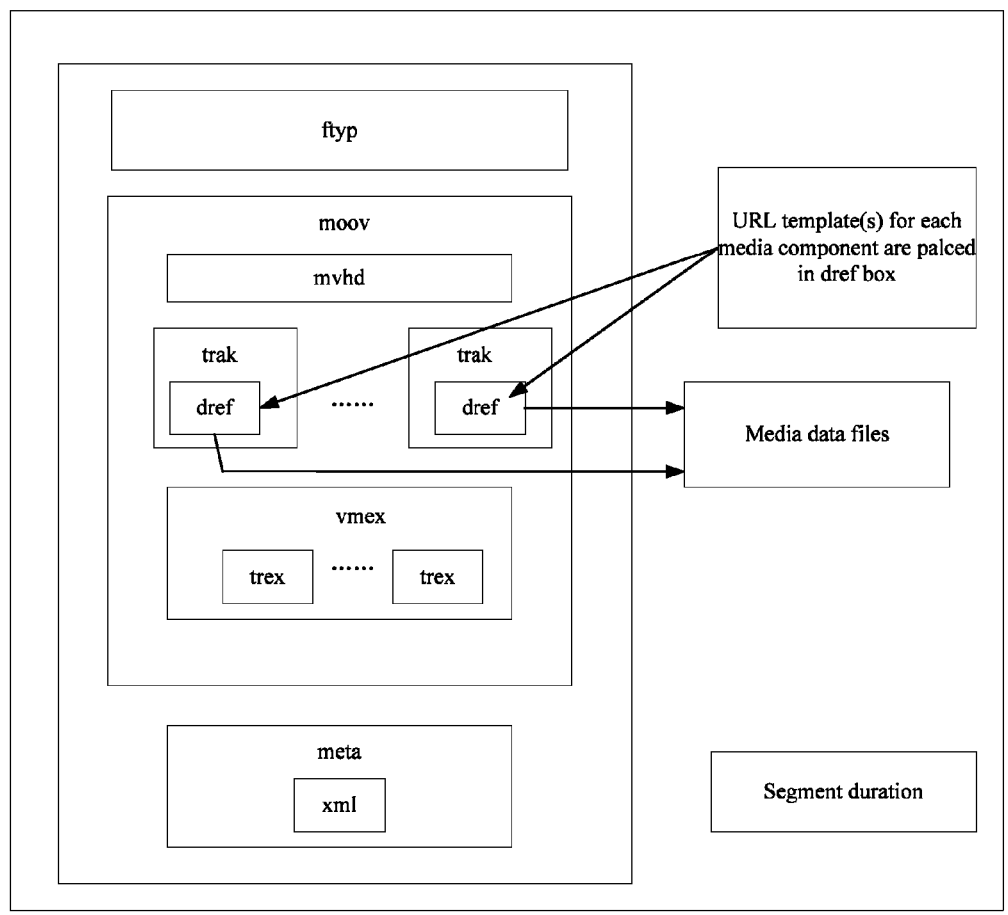
FIG. 4 is a schematic structural diagram of a media presentation description file according to an embodiment of the present invention.

A structure of a media presentation description file is shown in FIG. 4. The file is extended on the basis of an ISO basic file and a 3GP file format. This file includes three objects with respect to file layers. "ftyp" identifies a file type, and specifies a specification that a file complies with; "moov" includes multiple objects that define metadata of a media presentation; and "meta" includes metadata. Other objects are further nested in each object.

"moov" includes description about basic information of media data. Different "traks" provide description about different media components. For example, trak 1 describes information about a video component, for example, a codec, bit rate, frame rate, and resolution; trak 2 describes information about an audio component, for example, a language, volume, monophonic sound or stereophonic sound.

In the embodiment, a location of a media fragment file may be described through a uniform resource locator template (URL template). The uniform resource locator template is a string that ends with a null character (null), and includes a variable. When a uniform resource locator that is practically used is constructed, the variable in the uniform resource locator template needs to be replaced. For example, the template is http://www.huawei.com/v/audio/a{index}.dat, and when a uniform resource locator is generated, the {index} in the template is replaced with a file sequence number "8", to obtain the following:

http://www.huawei.com/v/audio/a8.dat.

The uniform resource locator template that describes the location of the media fragment file is stored in an object "dref", the "dref" is included in the object "trak", and the "trak" is included in the object "moov".

In this example, the time length of the media fragment is included in the object "meta", which is specifically given in "xml".

Figure 5:
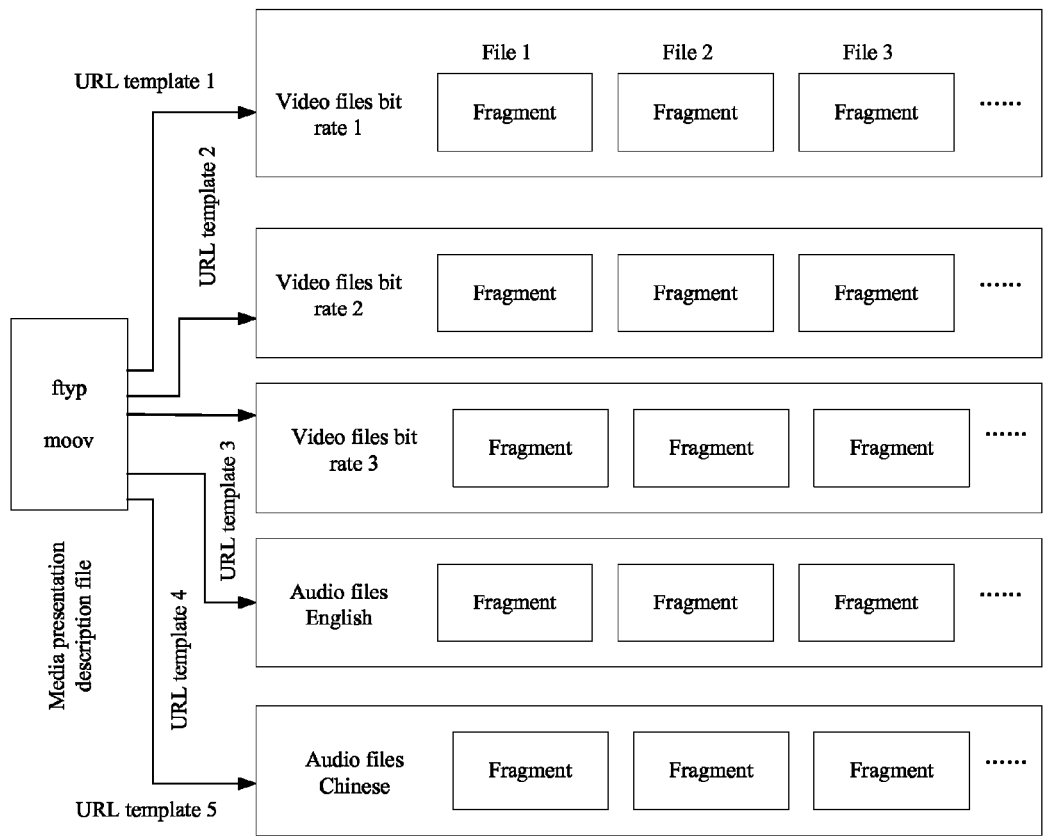
FIG. 5 is a schematic diagram of a media file organization form according to an embodiment of the present invention.

An organization form of a media file in the embodiment of the present invention is shown in FIG. 5.

The media in FIG. 5 include a video component and an audio component. The video component has three types of code representations of different bit rates, and the audio component has two types of code representations of different languages. The information of each type of code representation, for example, basic information of the media such as a codec type, an encoding rate, a frame rate, a resolution, and a volume, is included in the media presentation description file in the figure. The media presentation description file describes the location of the media fragment file through a uniform resource locator template. The media presentation description file may further include time length of the media fragment.

The embodiment of the present invention provides a media presentation description file. The file may include a uniform resource locator template. The template may be used for the client to generate a uniform resource locator corresponding to a media fragment that is required to be played. The uniform resource locator may be used to indicate a location of a media fragment file that is required to be played. The file may further include time length of the media fragment, and the time length is used for the client to determine location information of the media fragment that is required to be played.

When a live content is created, a media fragment may be generated at fixed time intervals, and each media fragment is stored as an independent file. The media fragment file includes a single media representation, or a combination of different media representations. Each media fragment file can be accessed uniquely. A name of a file may include two parts: a basic name and a sequence number, like a1.dat, a2.dat, . . . . A file sequence number corresponding to a first media fragment is 1, and the sequence number increases at a step length of 1 in time order. Media fragment files that employ the same code representation or the same combination of code representations are stored in the same path, and a uniform resource locator may be used to describe the location of the files.

Each media fragment file may include a single code representation so that different code representations can be combined flexibly without redundancy, so as to save storage space. Each media fragment may also allow a combination of different code representations, for example, a combination of a video code representation of a certain rate and an audio code representation of a certain language.

Figure 6:
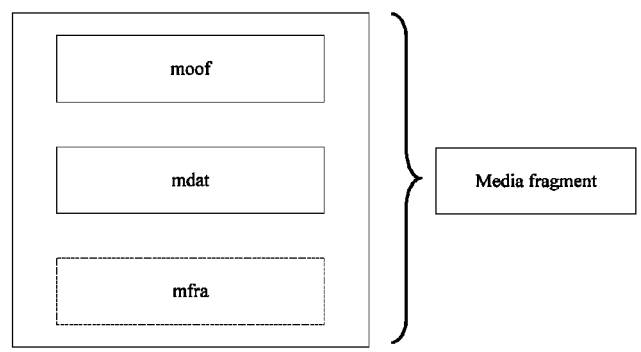
FIG. 6 is a schematic diagram of a media fragment according to an embodiment of the present invention.

FIG. 6 is a schematic diagram of a media fragment according to an embodiment of the present invention. As shown in FIG. 6, a media fragment includes the following parts. "moof" is used to describe metadata of the media fragment. Because the media are created in real time in a live play process, information about all media data is not obtained beforehand. The "moof" includes only media basic information, and describes special metadata of the media fragment. "mdat" is used to encapsulate media data of the fragment, namely, to encode the fragment, and may include the code representation of a single media component or a combination of code representations of different media components. In a dotted box, "mfra" is an optional part, and is used to describe a random access point in the media fragment. A combination of code representations of different media components may be allowed to exist in the media fragment.

Through the embodiment of the present invention, the server sends the live play start time and the current time of the server to the client, so that the client can obtain, according to the live play start time and the current time of the server, location indication information of a media fragment file that is required to be played, and further obtain a media fragment file corresponding to the location indication information from the server, so as to implement a live play service of the HTTP-based streaming media. Through the embodiment of the present invention, it is not necessary to extend the HTTP protocol or add additional functions to the server, and the existing basic facilities can be made full use of, so as to save investments and reduce costs. Besides, because each media fragment is stored on the server as an independent file, the media fragment can be obtained directly through the location indication information, so as to prevent frequent access of the same index file and improve efficiency of a live play.

Figure 7:
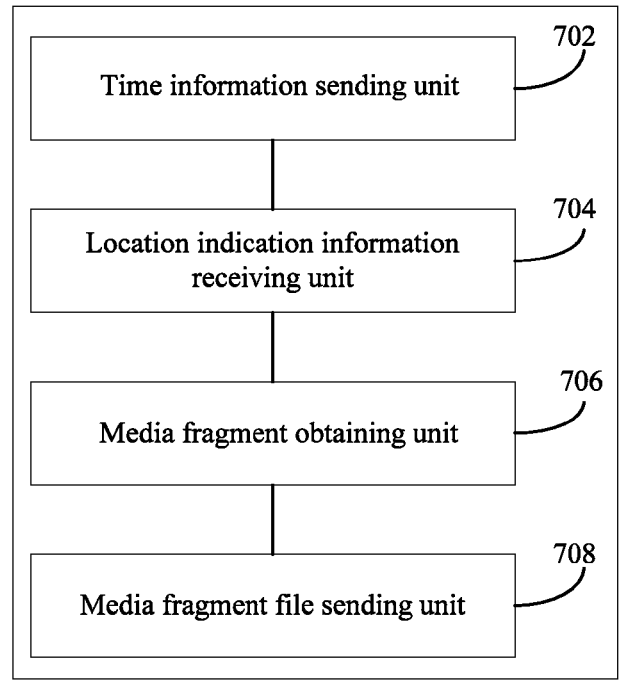
FIG. 7 is a schematic structural diagram of a server according to an embodiment of the present invention.

As shown in FIG. 7, an embodiment of the present invention provides a server, which may specifically be a streaming server. The server includes:

a time information sending unit 702, configured to send live play start time and current time of a server to a client, so that the client determines, according to the live play start time and the current time of the server, location indication information of a media fragment file that is required to be played, where the location indication information may be a uniform resource locator (Uniform Resource Locator, URL), or may also be information indicative of a file location, such as a file index number, and a media fragment that is required to be played by the client may be a latest media fragment being played live, or a media fragment that starts from a specific past time as specified by the client according to practical requirements;

a location indication information receiving unit 704, configured to receive, from the client, the location indication information of the media fragment file that is required to be played;

a media fragment obtaining unit 706, configured to obtain the media fragment file from a storage unit according to the location indication information that is of the media fragment required to be played on the client; and a media fragment file sending unit 708, configured to send the media fragment file to the client.

Figure 8:
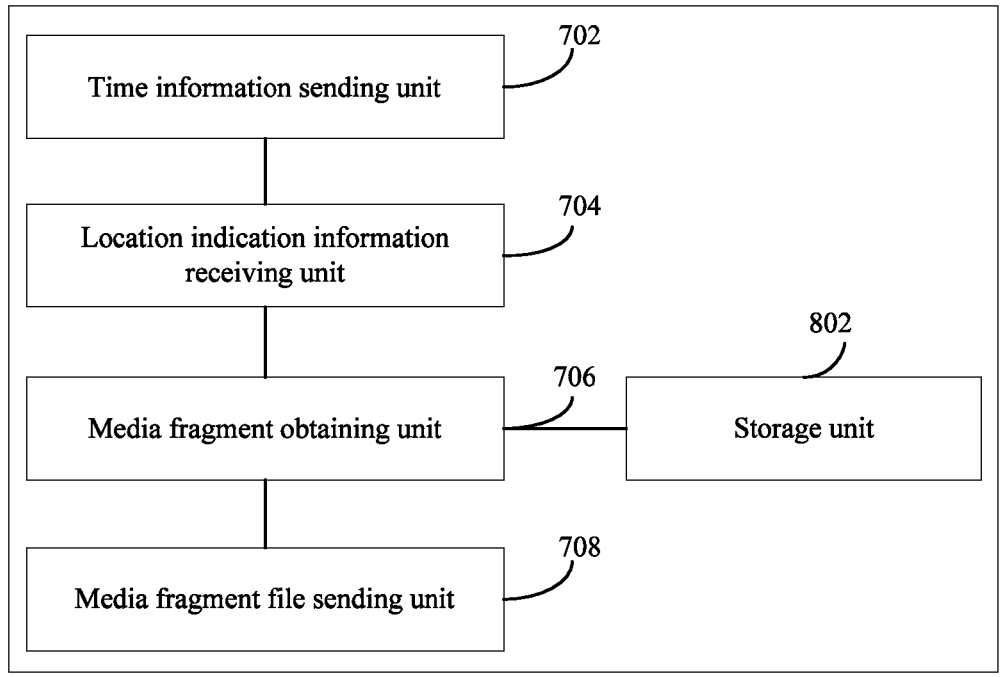
FIG. 8 is a schematic structural diagram of another server according to an embodiment of the present invention.

As shown in FIG. 8, the server may further include: a storage unit 802, configured to store each media fragment of streaming media in the form of a single file. The format of the media fragment is similar to that described in the preceding embodiment, and is not repeated here any further. The media fragment file obtaining unit 706 is configured to obtain the media fragment file from the storage unit 802 according to the location indication information that is of the media fragment file required to be played on the client.

Figure 9:
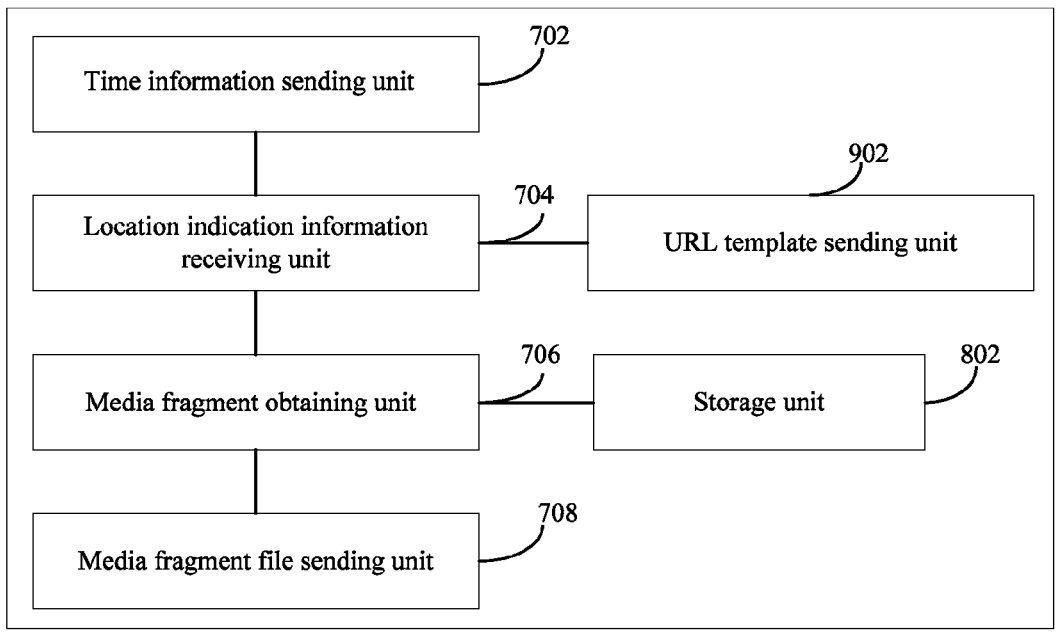
FIG. 9 is a schematic structural diagram of still another server according to an embodiment of the present invention.

As shown in FIG. 9, the server may further include: a uniform resource locator template sending unit 902, configured to send a uniform resource locator template to a client device, so that the client device generates, according to the uniform resource locator template, a uniform resource locator corresponding to the media fragment file that is required to be played.

The media fragment file obtaining unit 706 is configured to obtain the media fragment file from the storage unit 802 according to the uniform resource locator that is of the media fragment file required to be played on the client.

In the embodiment of the present invention, the live play start time sent by the server to the client may be carried in a Hyper Text Transfer Protocol HTTP header Last-Modified or in a media presentation description file; and the current time of the server sent to the client may be carried in a Hyper Text Transfer Protocol HTTP header Date. However, the embodiment of the present invention is not limited to the protocol and the fields described above, and other protocols and fields may also be adopted. When the two fields described above are used, the HTTP protocol is not required to be extended and investments can be saved.

The units in the embodiment of the present invention may be integrated together or deployed separately. The units may be combined into one unit, or may be split into multiple subunits.

In the embodiment of the present invention, the server may be a streaming server or the like, and the client device may be a mobile phone, computer, personal digital assistant (Personal Digital Assistant, PDA), small server, household appliance, router, switch, base station, or any electronic device, network device, or computer-related device.

Through the embodiment of the present invention, the time information sending unit of the server sends the live play start time and the current time of the server to the client, so that the client can obtain, according to the live play start time and the current time of the server, the location indication information that is of the media fragment file required to be played by the client, and further obtain the media fragment file corresponding to the location indication information from the server, so as to implement the live play service of the HTTP-based streaming media. It is not necessary to extend the HTTP protocol or add additional functions to the server, and the existing basic facilities can be made full use of, so as to save investments and reduce costs. Besides, because each media fragment is stored on the storage unit of the server as an independent file, the media fragment can be obtained directly through the location indication information, so as to prevent frequent access of the same index file and improve efficiency of the live play.

Figure 10:
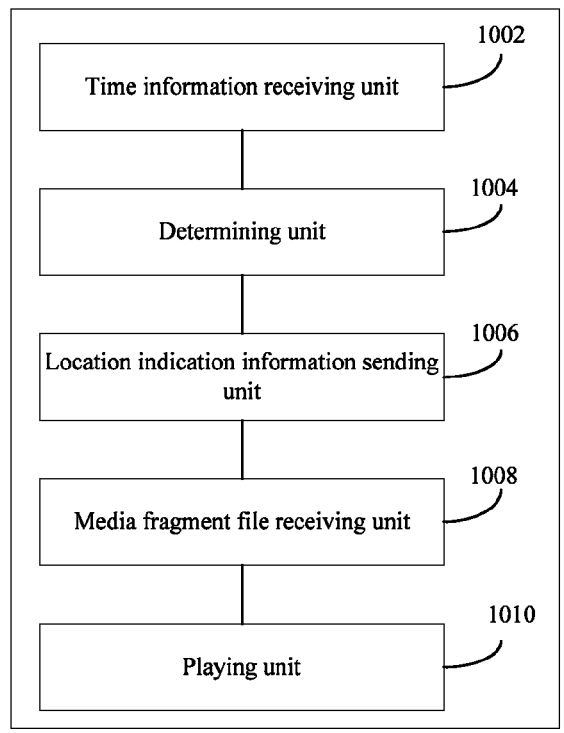
FIG. 10 is a schematic structural diagram of a client device according to an embodiment of the present invention.

As shown in FIG. 10, an embodiment of the present invention provides a client device, including:

a time information receiving unit 1002, configured to receive live play start time and current time of a server from the server;

a determining unit 1004, configured to determine, according to the live play start time and the current time of the server, the location indication information of the media fragment file that is required to be played, where the media fragment that is required to be played by the client may be a latest media fragment being played live, or a media fragment that starts from a specific past time as specified by the client according to practical requirements;

a location indication information sending unit 1006, configured to send, to the server, the location indication information of the media fragment file that is required to be played, where the location indication information may be a uniform Resource Locator (Uniform Resource Locator, URL) or may also be information indicative of a file location such as a file index number or the like;

a media fragment file receiving unit 1008, configured to receive, from the server, a media fragment file corresponding to the location indication information of the media fragment file that is required to be played; and a playing unit 1010, configured to play the media fragment file.

Figure 11:
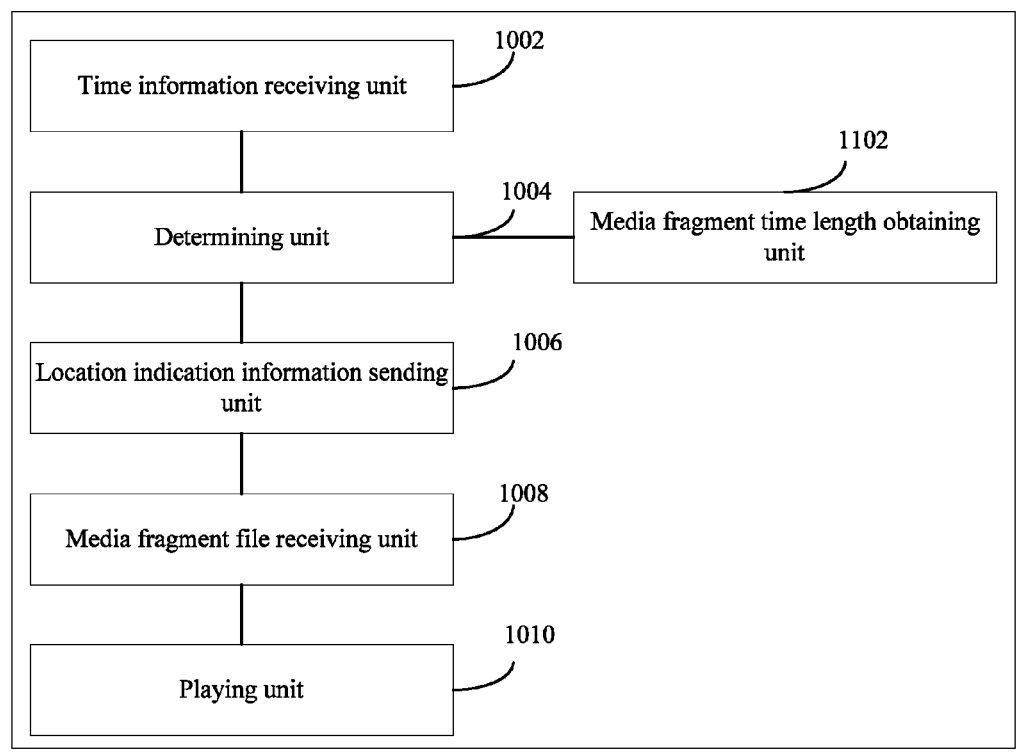
FIG. 11 is a schematic structural diagram of another client device according to an embodiment of the present invention.

As shown in FIG. 11, the client device may further include: a media fragment time length obtaining unit 1102, configured to obtain time length of a media fragment, where the time length of the media fragment may be obtained locally or from the server.

The determining unit 1004 is configured to determine location information of a media fragment that is required to be played, according to live play start time, current time of a server, and the time length of the media fragment; and generate location indication information of a media fragment file that is required to be played, according to the location information.

Figure 12:
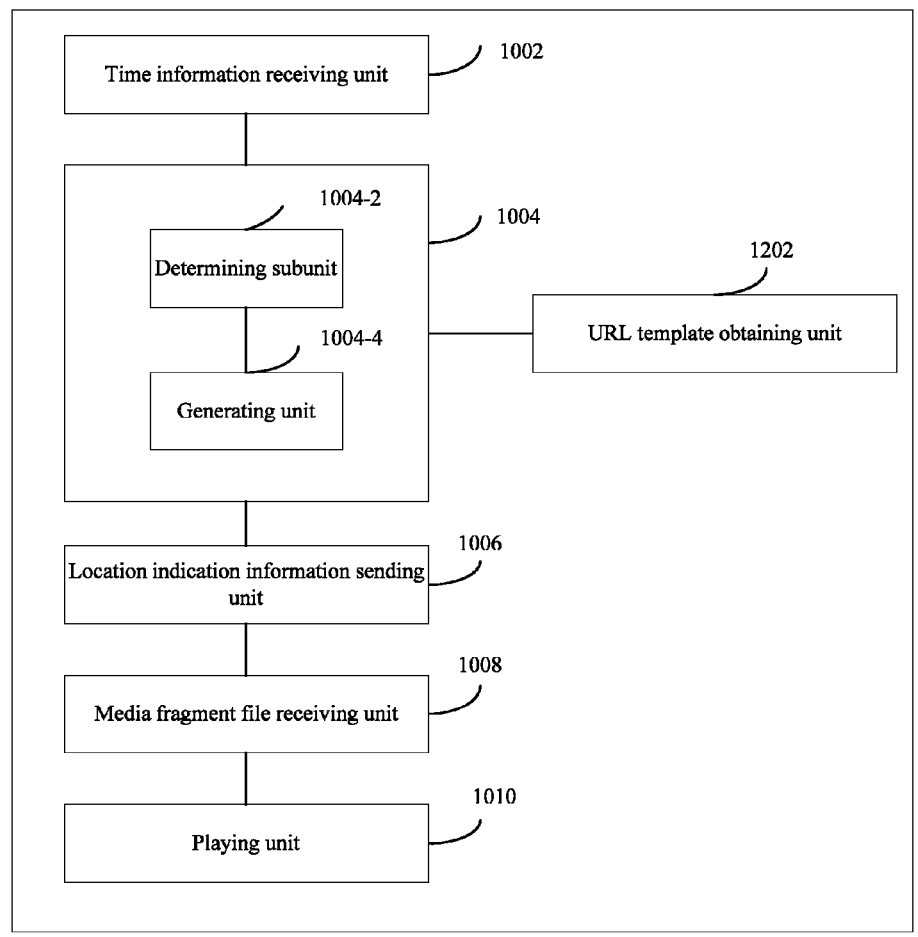
FIG. 12 is a schematic structural diagram of still another client device according to an embodiment of the present invention.

As shown in FIG. 12, the client device may further include:

a uniform resource locator template obtaining unit 1202, configured to obtain a uniform resource locator template, where the uniform resource locator template may be obtained locally or from the server.

The determining unit 1004 includes:

a determining subunit 1004-2, configured to determine a sequence number of the media fragment that is required to be played, according to the live play start time, current time of the server, and the time length of the media fragment; and a generating unit 1004-4, configured to generate a uniform resource locator corresponding to the media fragment file that is required to be played, according to the sequence number and the uniform resource locator template.

In the embodiment of the present invention, the live play start time sent by the server to the client may be carried in a Hyper Text Transfer Protocol HTTP header Last-Modified or in a media presentation description file; and the current time of the server sent to the client may be carried in a Hyper Text Transfer Protocol HTTP packet header Date. However, the embodiment of the present invention is not limited to the protocol and the fields described above, and other protocols and fields may also be adopted. When the two fields described above are used, the HTTP protocol is not required to be extended and investments can be saved.

The units of this embodiment may be integrated together or deployed separately. The units may be combined into one unit, or split into multiple subunits.

In the embodiment of the present invention, the server may be a streaming server or the like, and the client device may be a mobile phone, computer, personal digital assistant (Personal Digital Assistant, PDA), small server, household appliance, router, switch, base station, or any electronic device, network device, or computer-related device.

Through the embodiment of the present invention, the time information sending unit of the server sends the live play start time and the current time of the server to the client, so that the client can obtain, according to the live play start time and the current time of the server, the location indication information of the media fragment file that is required to be played by the client, and further obtain the media fragment file corresponding to the location indication information from the server, so as to implement the live play service of the HTTP-based streaming media. It is not necessary to extend the HTTP protocol or add additional functions to the server, and the existing basic facilities can be made full use of, so as to save investments and reduce costs.

Figure 13:
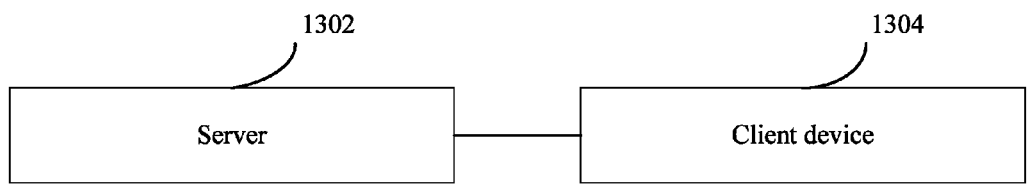
FIG. 13 is a schematic structural diagram of a network system according to an embodiment of the present invention.

As shown in FIG. 13, an embodiment of the present invention provides a network system, including:

a server 1302, configured to: send live play start time and current time of the server to a client, so that the client can determine, according to the live play start time and the current time of the server, location indication information of a media fragment file that is required to be played; receive the location indication information that is of the media fragment file required to be played on the client; obtain the media fragment file according to the location indication information that is of the media fragment file required to be played on the client; and send the media fragment file to the client; and a client device 1304, configured to: receive the live play start time and current time of the server from the server, determine, according to the live play start time and the current time of the server, the location indication information of the media fragment file that is required to be played, send, to the server, the location indication information of the media fragment file that is required to be played, receive, from the server, a media fragment file corresponding to the location indication information of the media fragment file that is required to be played, and play the media fragment file.

The server 1302 is further configured to store each media fragment of streaming media in the form of a single file.

In the embodiment of the present invention, the live play start time sent by the server to the client may be carried in a Hyper Text Transfer Protocol HTTP header Last-Modified or in a media presentation description file, and the current time of the server sent to the client may be carried in a Hyper Text Transfer Protocol HTTP header Date.

In the embodiment of the present invention, the server 1302 may be a streaming server, and the client device 1304 may be a mobile phone, computer, personal digital assistant (Personal Digital Assistant, PDA), small server, household appliance, router, switch, base station, or any electronic device, network device, or computer-related device. The connection mode of the network system may be wired connection or wireless connection. The wireless connection mode may be: Global System for Mobile Communications (Global System for Mobile Communications, GSM), Wideband-Code Division Multiple Access (Wideband-Code Division Multiple Access, WCDMA), Time Division-Synchronized Code Division Multiple Access (Time Division-Synchronized Code Division Multiple Access, TD-SCDMA), Code-Division Multiple Access (Code-Division Multiple Access, CDMA), Worldwide Interoperability for Microwave Access (Worldwide Interoperability for Microwave Access, WIMAX), Wireless Local Area Network (Wireless Local Area Network, WLAN), or Long Term Evolution (Long Term Evolution, LTE).

Through the embodiment of the present invention, the time information sending unit of the server sends the live play start time and the current time of the server to the client, so that the client can obtain, according to the live play start time and the current time of the server, the location indication information of the media fragment file that is required to be played by the client, and further obtain the media fragment file corresponding to the location indication information from the server, so as to implement the live play service of the HTTP-based streaming media. It is not necessary to extend the HTTP or add additional functions to the server, and the existing basic facilities can be made full use of, so as to save investments and reduce costs. Besides, because each media fragment is stored on the server as an independent file, the media fragment can be obtained directly through the location indication information, so as to prevents frequent access of the same file and improve efficiency of a live play.

The units and the calculation steps of examples described in the embodiments of the present invention may be implemented by electronic hardware, or computer software, or a combination of the electronic hardware and computer software. To clarify the interchangeability between hardware and software, the foregoing description has generically clarified the composition and the steps of embodiments according to functions. As regards whether the functions are implemented by hardware or software, it depends on the specific application of the technical solutions and the constraint conditions of the design. Those skilled in the art can use different methods to implement the described functions in each specific application, but such implementation shall be considered to fall within the scope of the embodiments of the present invention.

The steps of the method or algorithm described herein may be implemented through hardware, a software module executed by a processor, or the combination of the hardware and the software. The software module may be located in a random access memory (RAM), computer memory, read-only memory (ROM), electrically programmable ROM, electrically erasable programmable ROM, register, hard disk, moveable disk, CD-ROM, or any other storage media.

The above description is merely about exemplary implementation of the present invention, but not intended to limit the protection scope of the present invention. Any modifications, variations or replacements that can be easily derived by those skilled in the art within the technical scope disclosed by the present invention shall fall within the protection scope of the present invention. Therefore, the protection scope of the present invention is subject to the appended claims.

What is claimed is:

1. A method for implementing a Hyper Text Transfer Protocol-based streaming service, comprising:
receiving, by a server having a processor, a request from a client, and returning a response, to the client, that carries a media presentation description file and carries a live play start time and a current time of the server;
receiving, by the server, a uniform resource locator from the client that was generated based on the live play start time and the current time of the server, and obtaining a corresponding media fragment file;
returning the corresponding media fragment file to the client for playing on the client, wherein the uniform resource locator is determined by the client, and is used by the client to request the corresponding media fragment file from the server, wherein the media presentation description file comprises a uniform resource locator template to be used by the client to generate the uniform resource locator corresponding to a media fragment to be played; and receiving, by the server, a next uniform resource locator, the next uniform resource locator based on a file sequence number that increases incrementally, the next uniform resource locator generated by the client, which replaces a variable in the uniform resource locator template with the sequence number.

2. The method according to claim 1, wherein:
the returning, by the server, the response that carries the media presentation description file according to the request for the media presentation description file to the client further comprises:
carrying the current time of the server in a date field of a Hyper Text Transfer Protocol header to notify the client.

3. The method of claim 1, in which the response carries the live play start time in either the media presentation description file or in a Last-Modified field of a Hyper Text Transfer Protocol header.

4. A method for implementing a Hyper Text Transfer Protocol-based streaming service, comprising:
sending, by a client device, a request to a server, wherein the request is used for the server to return, according to the request, a response that carries a media presentation description file to the client device, wherein the media presentation description file comprises a uniform resource locator template;
setting up, by the client device, a time synchronization relationship with the server;
determining, by the client device, a uniform resource locator of a media fragment to be played based at least in part on a live play start time and a current time of the server;
by the client device, sending, to the server, the uniform resource locator corresponding to the media fragment to be played, to request a media fragment file;
receiving the media fragment corresponding to the uniform resource locator, from the server, and playing the media fragment file; and
sending, by the client device, a next uniform resource locator, the next uniform resource locator based on a file sequence number that increases incrementally, the next uniform resource locator generated by the client device, which replaces a variable in the uniform resource locator template with the sequence number.

5. The method according to claim 4, wherein:
according to the current time of the server and the live play start time, the client device calculates a sequence number L of a latest media fragment file being played live, and assigns the file sequence number L to a local variable N that represents a sequence number of a file that is to be obtained, wherein L is obtained through:

$$L = \text{int}((T-T0)/Ts),$$

wherein
T is the current time of the server, T0 is the live play start time, Ts is time length of the media fragment, int( ) is a rounding function, and int(x) represents a maximum integer not greater than x.

6. The method of claim 4, further comprising receiving the live play start time in either the media presentation description file or in a Last-Modified field of a Hyper Text Transfer Protocol header.

7. The method of claim 4, further comprising receiving the current time of the server in a date field of a Hyper Text Transfer Protocol header.

8. A server for implementing a Hyper Text Transfer Protocol-based streaming service, comprising:
a memory;
a transceiver configured for wireless communication; and
at least one processor coupled to the memory and the transceiver, the at least one processor configured to:
receive a request from a client, and return a response, to the client, that carries a media presentation description file and carries a live play start time and a current time of the server;
receive a uniform resource locator from the client that was generated based on the live play start time and the current time of the server;
obtain a corresponding media fragment file;
return the corresponding media fragment file to the client for playing on the client, wherein the uniform resource locator is determined by the client, and is used by the client to request the corresponding media fragment file from the server, wherein the media presentation description file comprises a uniform resource locator template to be used by the client to generate the uniform resource locator corresponding to a media fragment to be played; and
receive a next uniform resource locator, the next uniform resource locator based on a file sequence number that increases incrementally, the next uniform resource locator generated by the client, which replaces a variable in the uniform resource locator template with the sequence number.

9. The server according to claim 8, wherein the at least one processor is further configured to return the response that carries the media presentation description file according to the request for the media presentation description file to the client by carrying the current time of the server in a date field of a Hyper Text Transfer Protocol header to notify the client.

10. The server of claim 8, in which the response carries the live play start time in either the media presentation description file or in a Last-Modified field of a Hyper Text Transfer Protocol header.

11. A client device for implementing a Hyper Text Transfer Protocol-based streaming service, comprising:
a memory;
a transceiver configured for wireless communication; and
at least one processor coupled to the memory and the transceiver, the at least one processor configured to:
send a request to a server, wherein the request is used for the server to return, according to the request, a response that carries a media presentation description file to the transceiver, wherein the media presentation description file comprises a uniform resource locator template;
set up a time synchronization relationship with the server;
determine a uniform resource locator of a media fragment to be played based at least in part on a live play start time and a current time of the server;
send to the server, the uniform resource locator corresponding to the media fragment to be played, to request a media fragment file;
receive the media fragment file corresponding to the uniform resource locator, from the server, and to play the media fragment file; and
send a next uniform resource locator, the next uniform resource locator based on a file sequence number that increases incrementally, the next uniform resource locator generated by the client device, which replaces a variable in the uniform resource locator template with the sequence number.

12. The client device according to claim 11, wherein the at least one processor is further configured to:
    calculate a sequence number L of a latest media fragment file being played live according to the current time of the server and the live play start time, and to assign the file sequence number L to a local variable N that represents a sequence number of a file that is to be obtained, wherein L is obtained through:
    L=int((T−TO)/Ts), wherein T is the current time of the server, TO is the live play start time, Ts is time length of the media fragment, int( ) is a rounding function, and int(x) represents a maximum integer not greater than x.

13. The client device of claim 11, in which the at least one processor is further configured to receive the live play start time in either the media presentation description file or in a Last-Modified field of a Hyper Text Transfer Protocol header.

14. The client device of claim 11, in which the at least one processor is further configured to receive the current time of the server in a date field of a Hyper Text Transfer Protocol header.

* * * * *